US005392996A

United States Patent [19]

Ussery

[11] Patent Number: 5,392,996

[45] Date of Patent: Feb. 28, 1995

[54] PESTICIDE DUSTER ATTACHMENT FOR PORTABLE BLOWER

[76] Inventor: Frank G. Ussery, 173 Farr Rd., Kathleen, Ga. 31047

[21] Appl. No.: 235,928

[22] Filed: May 2, 1994

[51] Int. Cl.[6] .......... A01C 15/04

[52] U.S. Cl. .......... 239/654; 406/38; 406/98; 406/141; 406/153; 406/122; 222/630

[58] Field of Search .......... 239/654, 652, 650, 302, 239/320, 321, 325, 337, 346, 351, 355, 357, 372; 406/38, 96, 98–104, 141, 142, 151, 153, 122; 222/630, 637

[56] References Cited

U.S. PATENT DOCUMENTS

| | | | |
|---|---|---|---|
| De. 273,266 | 4/1984 | Souza | D8/2 |
| 1,475,957 | 12/1923 | Lemons | 406/38 |
| 2,595,528 | 5/1952 | Kempthorne | 239/351 |
| 2,961,129 | 11/1960 | Bullock | 239/654 |
| 3,174,251 | 3/1965 | West | 239/654 |
| 3,586,215 | 6/1971 | Roche | 406/102 |
| 3,854,634 | 12/1974 | Hart | 406/136 |
| 4,071,170 | 1/1978 | Gunzel, Jr. et al. | 406/98 |
| 4,256,241 | 3/1981 | Mesic | 222/85 |
| 4,519,548 | 5/1985 | Farmer | 239/652 |
| 5,226,567 | 7/1993 | Sansalone | 222/195 |

FOREIGN PATENT DOCUMENTS

| | | | |
|---|---|---|---|
| 170256 | 7/1951 | Austria | 239/351 |

*Primary Examiner*—Karen B. Merritt

*Attorney, Agent, or Firm*—Jacobson, Price, Holman & Stern

[57] ABSTRACT

A duster attachment includes a closed bottom, upwardly opening cylindrical container. An upright vacuum tube has its lower end secured through the bottom of the container and includes an upper end provided with variable air inlet structure. A closed top and downwardly opening pilot tube is loosely telescoped downwardly over the vacuum tube and includes an annular plate secured about the pilot tube lower end. Dusting powder is disposed within the container below the annular plate and the lower end of the vacuum tube is communicated with the air inlet of a leaf blower.

11 Claims, 2 Drawing Sheets

PESTICIDE DUSTER ATTACHMENT FOR PORTABLE BLOWER

BACKGROUND OF THE INVENTION

1. Field of the Invention

This invention relates to an attachment for a portable blower of the type which is either gasoline powered or electric motor powered and conventionally used as a leaf blower. The attachment incorporates a hopper for containing dusting powder or granules and defines an air flow passage extending therethrough with the hopper comprising an intermediate length portion of the air flow passage and the outlet end of the air flow passage adapted for partial communication with the air intake of the associated blower.

2. Description of Related Art

Various different forms of powder or pesticide dispensers heretofore have been provided by which dusting powders or granules may be dispensed in an air flow. Examples of these previously known devices are discloses in U.S. Pat. Nos. 3,854,634, 4,256,241, 4,519,548 and 5,226,567 as well as DES.273,266.

Of these prior U.S. Pat. No. 3,854,634 is thought to be closest in construction and operation to the duster attachment of the instant invention in that it includes a dusting powder hopper and air flow passage which are operatively associated with each other in a similar, but reverse manner.

SUMMARY OF THE INVENTION

The duster attachment of the instant invention is specifically designed to be used in conjunction with the air inlet of a conventional gasoline powered or electric leaf blower. The duster attachment includes an air and dust outlet for registry with the central area, only, of the air intake of a leaf blower and in this manner the associated leaf blower provides the necessary vacuum to draw air through the duster attachment. Also, inasmuch as the duster attachment is disposed upstream from the air intake of the leaf blower, all dusting powder or granules discharged from the duster attachment pass through the blower assembly of the leaf blower and any clumps of dusting powder or granules tend to be broken up by the impeller wheel of the blower.

Further, inasmuch as air passing through the dusting attachment is under a partial vacuum, as opposed to pressure elevated relative to ambient air pressure, there is substantially no chance of insecticide dusting powder or the like escaping from the duster attachment other than from the air and dusting powder outlet thereof and since such air and dusting powder outlet is communicated with the air intake of the associated blower, accidental escape or leakage of perhaps somewhat toxic insecticide powder in the area adjacent the operator of the associated blower is substantially eliminated.

The main object of this invention is to provide an insecticide or other powder duster for use in conjunction with a conventional leaf blower.

Another object of this invention is to provide an insecticide dusting attachment which may be used in conjunction with substantially any form of blower assembly.

Another very important object of this invention is to provide a duster attachment for a portable leaf blower and which may be used not only for dusting with insecticide powder but also for dusting with other powders or granular materials.

A final object of this invention to be specifically enumerated herein is to provide a dusting attachment in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
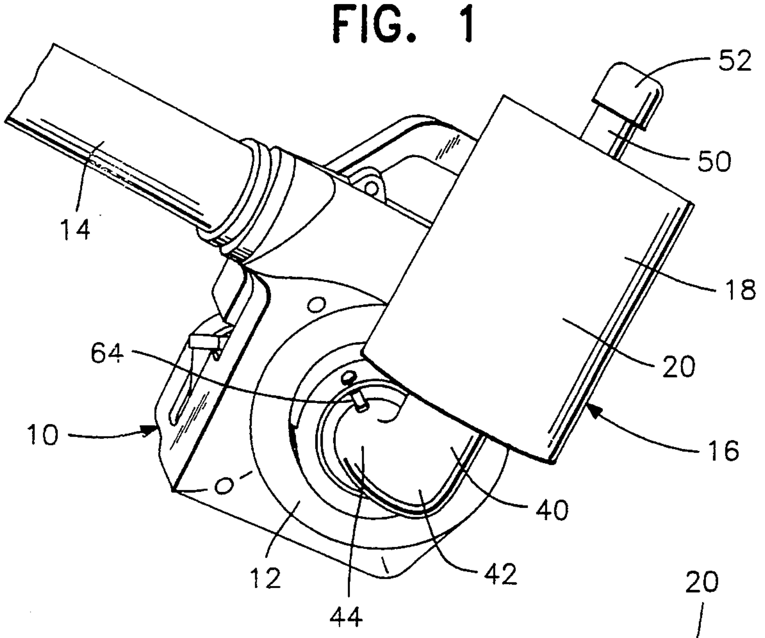
FIG. 1 is a fragmentary perspective view of a typical form of portable leaf blower with the pesticide duster attachment of the instant invention operatively associated with and supported from the central area of the air intake portion of the leaf blower.

Referring now more specifically to the drawings the numeral 10 generally designates a conventional form of gasoline engine powered leaf blow including an air intake shroud 12 and a discharge nozzle 14, the blower 10 being operable to intake air through the air intake shroud 12 and to discharge air under pressure through the discharge nozzle 14.

The reference numeral 16 generally designates the duster attachment of the instant invention. The attachment 16 includes an upwardly opening container 18 including cylindrical side walls 20 and an annular bottom wall 22. An upstanding vacuum tube 24 is provided and includes a lower outwardly opening outlet end 26 and an upper inlet end 28 variably closed by a rotatably adjustable closure cap 30. The lower outlet end 26 is secured through a central opening 32 formed in the bottom wall 22 and also through a central opening 34 formed in an annular end wall 36 closing the upper inlet end 40 of an elbow fitting 42 including a horizontal outlet end 44.

An upstanding pilot tube 46 is telescoped downwardly over the upper inlet end 28 of the vacuum tube 24 and has its lower end 48 secured through a central opening 50 formed in an annular transverse plate 52 loosely slidably received within the container 18. The closure cap 30 comprises a diametric enlargement on the upper end of the vacuum tube 24 and the pilot tube 46 is loosely received over the closure cap 30 in a manner such that an annular flow passage 54 is defined between the vacuum tube 24 and the pilot tube 46 below the closure cap 30.

The interior of the container 18 disposed below the transverse plate 52 defines a hopper for containing dusting powder 56 or the like and the upper end 58 of the pilot tube 46 is closed by a closure cap 52.

The upper end of the vacuum tube 24 includes four equally circumferentially spaced radial openings 54 formed therein and the closure cap 30 includes a cylindrical skirt 56 having downwardly opening notches 58 formed therein variably registrable with the openings 54. The cylindrical skirt 56 is snugly but rotatably received over the upper end of the vacuum tube 24 and thus may be angularly adjusted relative to the latter, but is held in adjusted angular position by friction.

The air intake shroud 12 has a tubular mounting nipple 60 mounted thereon through the utilization of circumferentially spaced mounting lugs 61 and a fastener 62 and the outlet end 44 of the elbow fitting 42 is loosely telescoped within the mounting nipple 60 and supported therefrom in coaxial relation therewith through the utilization of three circumferentially spaced mounting fixtures 64. Thus, the entire dusting attachments 16 is supported from the air intake shroud 12 of the blower 10 through the utilization of the mounting lugs 61 and the fastener 62.

Figure 2:
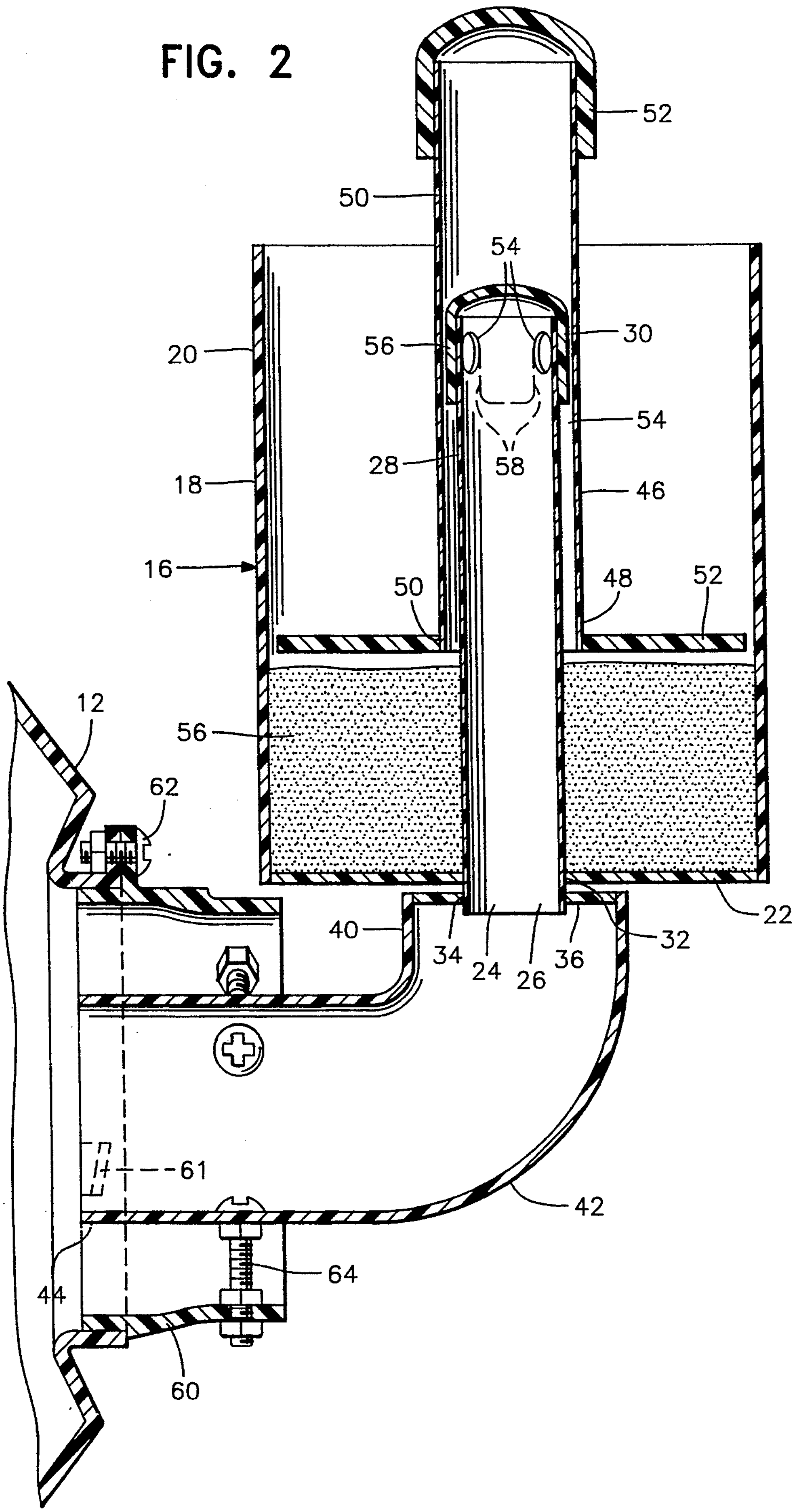
FIG. 2 is an enlarged fragmentary transverse vertical sectional view of the duster attachment and the adjacent air intake portions of the associated blower.

From a review of FIG. 2 it may be appreciated that the cross sectional area of the outlet end 44 is only approximately ¼ cross sectional area of the mounting nipple 60. Accordingly, the outlet end 44 is communicated, only partially, with the air intake for the blower 10 comprising the mounting nipple 60 and the inflow of air into the nipple 60 about the outlet end 44 creates a partial vacuum within the outlet end 44 and thus the vacuum tube 24, the pilot tube 46 and beneath the transverse plate 52.

This vacuum causes air to be drawn downwardly through the container 18 past the outer peripheral edges of the transverse plate 52 and then inwardly beneath the transverse plate 52 into the flow passage 54. The radial inward flow of air immediately beneath the transverse plate 52 causes some of the dusting powder 56 at the surface thereof to be entrained within the air flow moving into the lower end of the pilot tube 46. The flow of air having dusting powder 56 entrained therein then passes upwardly through the downwardly opening notches 58 and the radial openings 54 into the interior of the vacuum tube 24. Thereafter, the air flow, having dusting powder 56 entrained therein moves downwardly from the bottom of the vacuum tube 24 and into the elbow fitting 42 for exit therefrom from the outlet end 44 thereof. The air, having dusting powder entrained therein, mixes with the intake air passing into the mounting nipple 60 outwardly of the elbow fitting 42 and passes through the leaf blower 10 for discharge therefrom under pressure from the discharge nozzle 14.

The amount of dusting powder passed into the blower assembly 10 may be controlled two different ways. Firstly, the amount of suction in the outlet end 44 of the elbow fitting 42 may be greatly varied merely by varying the speed of operation of the motor or engine powering the blower assembly 10. Obviously, a low idle speed of operation may not cause sufficient vacuum in the outlet end 44 of the elbow fitting 42 to draw any appreciable amount of dusting powder 56 from the container 18. On the other hand, high speed operation of the motor or engine powering the blower 10 will be operative to create sufficient pressure in the outlet end 44 in order to insure that dusting powder is withdrawn from the container 18 and discharged from the outlet end 44. Secondly, the closure cap 30 may be angularly adjusted so as to vary the registration of the notches 58 with the radial openings 54. In this manner, the flow of air through the flow passage 54 may be controlled.

It is also possible that variable air inlet means could be provided for the upper end 50 of the pilot tube 46. This also would vary the amount of dusting powder 56 entrained in the air being discharged from the nozzle 14.

U.S. Pat. No. 3,854,634 discloses structure similar to the pilot tube 46 and transverse plate of the instant invention. However, such previously patented structured is subject to air pressure above ambient air pressure and, accordingly, if toxic dusting powder is being dispensed there is a possibility for leakage of such toxic dusting powder in the area of the operator. Further, by subjecting the interior of the container 18 below the transverse plate 52 to a partial vacuum, the pilot tube and transverse plate 52 are held in proper operating position, even when the container 18 is horizontally disposed. Subjecting similar structure to air under pressure as opposed to a vacuum would result in the transverse plate 52 having a tendency to be discharged outwardly of the open end of the container 18. Still further, inasmuch as the interior of the instant invention is subject to vacuum as opposed to pressure above atmospheric pressure, there is no need to provide the upper end of the container 18 with any form of closure.

Figure 3:
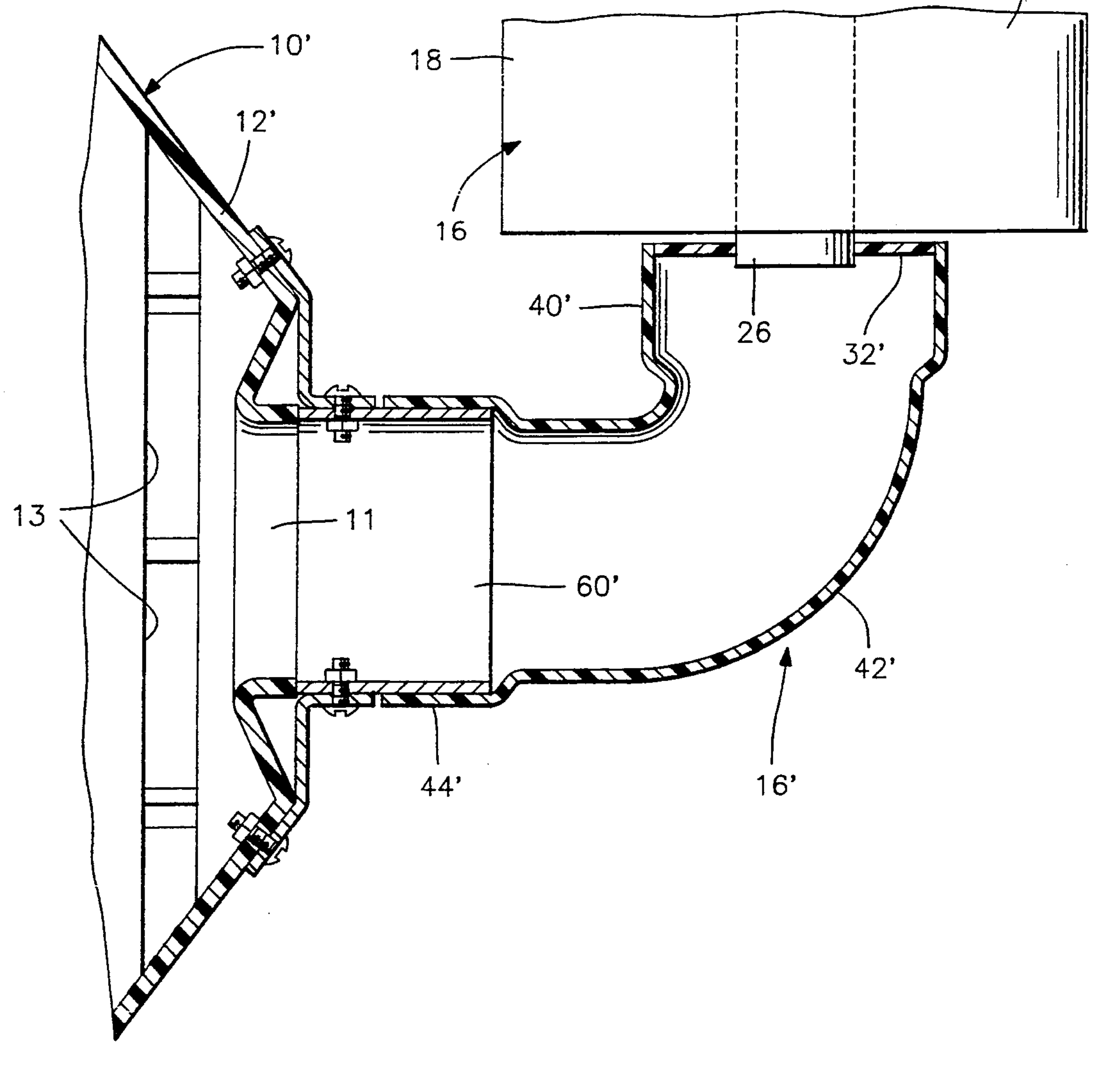
FIG. 3 is a fragmentary enlarged transverse vertical sectional view of the lower portion of the insecticide duster attachment and illustrating the mounting thereof from a modified form of leaf blower.

With attention now invited more specifically to FIG. 3, a modified form of attachment 16' is illustrated. The attachment 16' differs from the dusting attachment 16 in that the outlet end 44' of the elbow fitting 42' thereof comprises a bell end tightly telescoped over the outer end of a mounting nipple 60' removably mounted from the air intake shroud 12' of a modified form of leaf blower 10' including a central air inlet opening 11 as well as outer peripheral air inlet openings 13, the outlet end 44' of the elbow fitting 42' thus being fully registered with the central air inlet opening 11. Otherwise, all of the components of the dusting attachment 16' are identical to the corresponding components of the dusting attachment 16 and are designated by corresponding prime reference numerals.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

What is claimed is:

1. A duster for a source of vacuum, said duster including an upwardly opening container having a bottom wall provided with a central opening formed therein, an upstanding vacuum tube including a lower outwardly opening outlet end secured to said bottom wall about said opening and an upper inlet end spaced at least appreciably above said bottom wall, an upstanding pilot tube having upper and lower ends, transverse plate means disposed in and loosely slidable within said container toward and away from said bottom wall and having a central opening formed therethrough about which the lower end of said pilot tube is secured to said plate means with said pilot tube loosely telescoped downwardly over said vacuum tube and the upper end of said pilot tube projecting above the upper end of said vacuum tube, the upper end of said pilot tube being at least substantially closed and the upper end of said vacuum tube including air flow controlling means operatively associated therewith for controlling the amount of air admitted into the upper end of said vacuum tube, a variable volume area of the interior of said container disposed between said plate means and said bottom wall being adapted to receive fine, granular dusting material therein, said outlet end of said vacuum tube being adapted to be communicated, with at least a portion of the air intake of a blower assembly including a pressurized air outlet through which air having predetermined amounts of dusting material entrained therein may be discharged from said air outlet.

2. The duster of claim 1 wherein said air flow controlling means includes air inlet openings formed in and spaced about the upper end of said vacuum tube and a downwardly opening cap telescoped downwardly over said upper end of said vacuum tube and angularly displaceable relative thereto, said cap including peripheral skirt means having downwardly opening notches formed therein variably registerable with said air inlet openings.

3. The duster of claim 2 wherein said peripheral skirt means defines a diametric enlargement of said vacuum tube and said pilot tube is loosely slidably received over said enlargement.

4. The duster of claim 1 wherein the upper end of said pilot tube is fully closed above the upper end of said vacuum tube.

5. The duster of claim 4 wherein said air flow controlling means includes air inlet openings formed in and spaced about the upper end of said vacuum tube and a downwardly opening cap telescoped downwardly over said upper end of said vacuum tube and angularly displaceable relative thereto, said cap including peripheral skirt means having downwardly opening notches formed therein variably registerable with said air inlet openings.

6. The duster of claim 5 wherein said peripheral skirt means defines a diametric enlargement of said vacuum tube and said pilot tube is loosely slidably received over said enlargement.

7. The duster of claim 1 wherein the interior of said container is substantially cylindrical and said transverse plate means is annular in configuration.

8. A duster including an upwardly opening container having a bottom wall provided with a central opening formed therein, an upstanding vacuum tube including a lower outlet end secured to said bottom wall about said opening and an upper inlet end spaced at least appreciably above said bottom wall, transverse plate means disposed in and loosely slidable within said container toward and away from said bottom wall and having a central opening formed therein through which said vacuum tube is loosely slidingly received, a variable volume area of the interior of said container disposed between said transverse plate means and said bottom wall being adapted to receive fine, granular dusting material therein, and communicating means defining a closed passage communicating said central opening in said plate means with the interior of said upper inlet end of said vacuum tube, said lower end of said vacuum tube being adapted to be communicated with the air intake of a blower assembly including a pressurized air outlet through which air having predetermined amounts of dusting material entrained therein may be discharged from said air outlet.

9. The duster of claim 8 wherein said communicating means includes air flow controlling means for controlling the air flow between said central opening in said plate means and the interior of said vacuum tube.

10. The duster of claim 8 including a motor driven blower having an ambient air inlet and a pressurized air outlet, said ambient air inlet being at least partially communicated with said outlet end of said vacuum tube.

11. The duster of claim 10 wherein said ambient air inlet is only partially communicated with said outlet end of said vacuum tube.

* * * * *